United States Patent [19]

Iwahashi et al.

[11] 3,957,921

[45] May 18, 1976

[54] THERMOPLASTIC RESIN COMPOSITION COMPRISING METHYL METHACRYLATE RESINS

[75] Inventors: Shunji Iwahashi; Fukuichi Morizane, both of Toyonaka; Yasuyuki Kato, Niihama, all of Japan

[73] Assignee: Sumitomo Chemical Company, Limited, Japan

[22] Filed: Nov. 19, 1973

[21] Appl. No.: 416,875

[30] Foreign Application Priority Data
Nov. 18, 1972 Japan............................. 47-116024

[52] U.S. Cl.................................. 260/901; 260/873
[51] Int. Cl.² ........................................ C08L 33/04
[58] Field of Search ..................................... 260/901

[56] References Cited
UNITED STATES PATENTS

| | | | |
|---|---|---|---|
| 2,887,464 | 5/1959 | Coover et al. | 260/899 X |
| 3,055,859 | 9/1962 | Vollmert | 260/899 X |
| 3,692,878 | 9/1972 | Blance et al. | 260/901 |

*Primary Examiner*—Carman J. Seccuro
*Attorney, Agent, or Firm*—Craig & Antonelli

[57] ABSTRACT

A thermoplastic resin composition consists essentially of from 10 to 95 parts by weight of a methyl methacrylate resin and from 90 to 5 parts by weight of a styrene-methyl methacrylate copolymer resin with or without from 5 to 150 parts by weight of a polycarbonate resin. A molded product from the composition has a beautiful, pearlescent luster and a high impact strength.

11 Claims, No Drawings

THERMOPLASTIC RESIN COMPOSITION COMPRISING METHYL METHACRYLATE RESINS

This invention relates to a thermoplastic resin composition. More particularly, it relates to a thermoplastic resin composition suitable as a material for producing a molded product with a beautiful pearlescent luster and a high impact strength.

It is known that, when a methyl methacrylate resin is mixed with a styrene resin and the resultant mixture is molded by a conventional procedure (e.g. using an extruder or an injection molding machine), a molded product having a pearlescent luster is obtained. However, the compatibility between a methyl methacrylate resin and a styrene resin is not entirely satisfactory so that the molded product of their blended composition is very much inferior to that of a methyl methacrylate resin or a styrene resin alone in certain mechanical properties, particularly impact strength and bending strength in the weld parts. Thus, the blended composition could not be adapted to the application requiring high mechanical strength.

It is also known that a mixture of a methyl methacrylate resin and a styrene homopolymer resin is admixed with an impact-resistant agent (e.g. chlorinated polyethylene, high impact polystyrene, acrylonitrile-butadiene rubber, transparent acrylonitrile-butadiene-styrene copolymer, ethylene-vinyl acetate copolymer) for the purpose of improving the impact resistance. However, the use of such impact-resistant agent results in disappearance of the inherent pearlescent luster though the impact strength is improved. Hence, this method could not be put to practical use.

As the result of various investigations, it has now been found that a thermoplastic resin composition consisting essentially of a methyl methacrylate resin and a styrene resin can afford a molded product having a beautiful, pearlescent luster. It has also been found that the incorporation of a polycarbonate resin into the said composition can afford a molded product having a beautiful, pearlescent luster and a high impact strength. This is of unexpected nature, because the use of an impact resistant agent instead results in the disappearance of the inherent pearlescent luster though the impact strength is improved, as mentioned above.

According to the invention, there is provided a thermoplastic resin composition which consists essentially of from 10 to 95 parts by weight (preferably from 20 to 90 parts by weight, more preferably from 30 to 80 parts by weight) of a methyl methacrylate resin and from 90 to 5 parts by weight (preferably from 80 to 10 parts by weight, more preferably from 70 to 20 parts by weight) of a styrene-methyl methacrylate copolymer resin having a weight ratio of styrene/methyl methacrylate of from 80/20 to 30/70 and a reduced viscosity of from 0.5 to 3.5 dl/g in a 1 % chloroform solution at 25°C and also a thermoplastic resin composition which consists essentially of from 10 to 95 parts by weight (preferably from 20 to 90 parts by weight, more preferably from 30 to 80 parts by weight) of a methyl methacrylate resin, from 90 to 5 parts by weight (preferably from 80 to 10 parts by weight, more preferably from 70 to 20 parts by weight) of a styrene-methyl methacrylate copolymer resin having a weight ratio of styrene/methyl methacrylate of from 80/20 to 70/30 and a reduced viscosity of from 0.5 to 3.5 dl/g in a 1 % chloroform solution at 25°C and a polycarbonate resin, the polycarbonate resin being present in an amount of from 5 to 150 parts by weight per 100 parts by weight of the combined amount of the methyl methacrylate resin and the styrene-methyl methacrylate copolymer resin.

When the thermoplastic resin composition of the present invention is molded by a conventional procedure, there is obtained a molded product having a beautiful, pearlescent luster and a high impact strength while retaining an excellent mechanical strength. This is surprising since the incorporation of a styrene homopolymer resin into a methyl methacrylate resin results in a poor mechanical strength, particularly at a weld line.

The methyl methacrylate resin used in the present invention includes a homopolymer of methyl methacrylate (i.e. polymethyl methacrylate) or a copolymer of methyl methacrylate with a vinyl monomer (e.g. acrylonitrile, N-allylmaleimide or an alkyl acrylate or methacrylate in which the alkyl group contains from 1 to 8 carbon atoms such as methyl acrylate, ethyl acrylate, butyl acrylate, ethyl methacrylate and butyl methacrylate). The amount of methyl methacrylate is not less than 80% by weight of this copolymer resin. The methyl methacrylate resin may be the one having a reduced viscosity of from 0.1 to 2.0 dl/g in a 1% chloroform solution at 25°C.

The styrene-methyl methacrylate copolymer resin used in the present invention includes the one having a weight ratio of styrene/methyl methacrylate of from 80/20 to 30/70 (preferably from 70/30 to 35/65, more preferably from 65/35 to 40/60) and a reduced viscosity of from 0.5 to 3.5 dl/g (preferably from 0.6 to 3.0 dl/g, more preferably from 1.0 to 2.7 dl/g) in a 1% chloroform solution at 25°C.

The polycarbonate resin used in the present invention is prepared in a conventional manner and includes 4,4'-dihydroxydiarylalkane polycarbonate obtained from 4,4'-dihydroxydiphenylalkane (e.g. bis(4-hydroxyphenyl)methane, bis(4-hydroxyphenyl)ethane, 2,2-bis(4-hydroxyphenyl)propane, bis-(4-hydroxy-3,5-dichlorophenyl)methane, 2,2-bis(4-hydroxy-3,5-dimethylphenyl)propane, bis (4-hydroxyphenyl)phenylmethane) and phosgene, ethyl formate or diethyl carbonate.

When the styrene content in the styrene-methyl methacrylate copolymer resin is larger than 80 % by weight and the reduced viscosity is lower than 0.5 dl/g or higher than 3.5 dl/g, the molded product is deteriorated in mechanical strength, particularly in strength of weld line. Further, the styrene-methyl methacrylate copolymer resin having a reduced viscosity of higher than 3.5 dl/g prevents moldability and the strength of weld line. When the methyl methacrylate content in the styrene-methyl methacrylate copolymer resin is larger than 70 % by weight, the refractive index of the ssaid copolymer resin becomes close to that of the methyl methacrylate resin so that the molded product made of their blended mixture is prevented pearlescent luster. The pearlescent luster is also prevented in case of the reduced viscosity being lower than 0.5 dl/g. When the reduced viscosity of the methyl methacrylate resin is relatively close to that of the styrene-methyl methacrylate copolymer resin (e.g. within 2 dl/g in the difference of the reduced viscosity), the resulting molded product has a beautiful, pearlescent luster and an excellent mechanical properties.

The incorporation of the polycarbonate resin into a composition containing the methyl methacrylate resin and the styrene-methyl methacrylate copolymer resin can afford a molded product having a high impact strength while retaining a beautiful, pearlescent luster. The polycarbonate resin may be present in an amount of from 5 to 150 parts by weight (preferably from 10 to 130 parts by weight, more preferably from 20 to 100 parts by weight) per 100 parts by weight of the combined amount of the methyl methacrylate resin and the styrene-methyl methacrylate copolymer resin. The use in a larger amount than the said upper limit does not assure a sufficient strength of weld line.

The composition of the present invention may be obtained by mixing these resins in powder in a conventional mixing procedure (e.g. dry blending, roll mixing or screw extruder mixing).

The composition of the invention may include any other additives (e.g. plasticizers, antistatic agents, dyestuffs, pigments, ultraviolet ray absorbents, lubricants) in such amounts as will not cause the disappearance of the pearlescent luster of the composition.

Particularly, the addition of plasticizers has an increasing effect not only on fluidity which facilitates molding, but also on impact strength. Examples of the plasticizer are phthalic esters, adipic esters, aliphatic esters, phosphoric esters, glycol derivatives, epoxy plasticizers, etc. Generally, the amount of plasticizers in total composition may not be more than 10% by weight. The addition of lubricants facilitates not only the release of a molded product from a die but also enhances the lubricating properties of the resins on the walls of a die or improves the lubrication between the resins, and makes large mutual molecular configuration difference on the surface of the molded product to increase the pearlescent luster, when molding is conducted.

Further, by the addition of dyestuffs and pigments, a molded product having a beautiful colored, pearlescent luster may be obtained. By the addition of a pearl pigment, it is possible to obtain a product having more pearlescent luster.

The composition of the invention can be readily molded by a conventional processing operation, e.g. by the use of an extruder or an injection molding machine.

Practical and presently preferred embodiments of the present invention are illustratively shown in the following Examples wherein parts and % are by weight. The reduced viscosity is determined in a 1 % chloroform solution at 25°C, the pearlescent luster of the molded product is judged by appearance, the impact stength is determined by dropping a steel ball of 95 g on the central part of the back of the molded product obtained by injection molding and measuring the lowest height of the falling ball which can break the molded product, the blending strength of weld line part of the molded product is measured in a span of 40 mm and a load speed of 2.5 mm/min. in such a manner that the can strikes the weld line of the test piece, and the melt index is measured under a load of 10 kg at 210°C according to ASTM D-1238.

EXAMPLE 1

Methyl methacrylate resin (reduced viscosity, 0.8 dl/g), prepared by polymerizing 97 % of methyl methacrylate and 3 % of ethyl acrylate, and styrene-methyl methacrylate resin having a component ratio and a reduced viscosity as shown in Table 1 are mixed uniformly in a mixing ratio as shown in Table 1. The resulting mixture was kneaded at 230° to 240°C and pelletized by a 40 mm $\phi$ extruder and molded by an injection molding machine (Model TS-150, manufactured by Nissei Resin Industrial Co., Ltd.) under the following conditions to form a vessel of 90 mm in diameter, 25 mm in depth and 1.7 mm in wall thickness and a test piece of 70 mm in length, 15 mm in width and 2 mm in thickness; molding pressure 800 kg/cm$^2$; molding speed 50 mm/sec; screw rotation 50 rpm; molding temperature 250°C; mold temperature 60°C.

The vessel was molded with a gate on the side and the test piece was molded with gates on both ends so that a weld line might be produced in the middle. The physical properties of the vessel and the test piece are shown in Table 1.

From Table 1, it will be appreciated that it is necessary to satisfy simultaneously the ratio of styrene/methyl methacrylate, the range of reduced viscosity and the component ratio of methyl methacrylate resin in the styrene-methyl methacrylate copolymer resin, in order to obtain a molded product having a beautiful, pearlescent luster and a high impact strength.

Table 1

| No. | | Blend ratio (parts by weight) | | | | Appearance (pearlescent luster) | Falling ball impact strength (cm) | Bending strength of weld line part (kg/cm$^2$) | Result |
|---|---|---|---|---|---|---|---|---|---|
| | | Methyl methacrylate resin | Styrene resin | Styrene-methyl methacrylate copolymer | | | | | |
| | | | | Amount | Ratio of styrene/methyl methacrylate | Reduced viscosity (dl/g) | | | | |
| 1 | Reference | 70 | 30 | — | | | good | 12 | 200 | x |
| 2 | Example | 90 | — | 10 | 65/35 | 0.60 | good | 18 | 460 | o |
| 3 | '' | 70 | — | 30 | 65/35 | 0.60 | '' | 20 | 430 | o |
| 4 | '' | 30 | — | 70 | 65/35 | 0.60 | '' | 17 | 380 | o |
| 5 | '' | 70 | — | 30 | 60/40 | 0.85 | '' | 26 | 540 | o |
| 6 | '' | 70 | — | 30 | 60/40 | 1.10 | '' | 25 | 540 | o |
| 7 | '' | 70 | — | 30 | 60/40 | 1.30 | '' | 24 | 550 | o |
| 8 | '' | 70 | — | 30 | 60/40 | 1.50 | '' | 23 | 550 | o |
| 9 | '' | 70 | — | 30 | 60/40 | 1.8 | '' | 20 | 540 | o |
| 10 | '' | 70 | — | 30 | 60/40 | 2.5 | '' | 23 | 500 | o |
| 11 | Reference | 70 | — | 30 | 20/80 | 0.5 | not good | 25 | 570 | x |
| 12 | Example | 70 | — | 30 | 40/60 | 1.2 | good | 24 | 550 | o |
| 13 | '' | 70 | — | 30 | 80/20 | 0.9 | '' | 20 | 390 | o |
| 14 | Reference | 70 | — | 30 | 90/10 | 0.6 | good | 13 | 220 | not sufficient strength |

Note:
*O: Superior to the existing product (Reference No. 1) in pearlescent luster and strength; x: Inferior to the existing product

EXAMPLE 2

Methyl methacrylate resin (reduced viscosity, 0.7 (melt index 1.7)) prepared by polymerizing 97% by weight of methyl methacrylate and 3% by weight of ethyl acrylate was uniformly mixed with styrene-methyl methacrylate resin having a weight ratio of styrene/methyl methacrylate of 60/40 (reduced viscosity, 1.8 (melt index, 2.4) and 2.5 (melt index, 0.7)) and polycarbonate (melt index, 2.2; molecular weight 27,000) in the mixing ratio of a composition as shown in Table 2. This polycarbonate is the polycondensate of bis(4-hydroxyphenyl) methane and phosgene. The resulting mixture was kneaded at 230° to 240°C. and pelletized by a 40 mm $\phi$ extruder and molded by an injection molding machine under the following conditions to form a vessel of 90 mm in diameter, 25 mm in depth and 1.7 mm in wall thickness and a test piece of 70 mm in length, 15 mm in width and 2 mm in thickness; molding pressure 1000 kg/cm$^2$; screw rotation 50 rpm; molding temperature 260°C; mold temperature 60°C.

The vessel was molded with a gate on the side and the test piece was molded with gates on both ends so that a weld line might be produced in the middle.

The physical properties of the vessel and the test piece are shown in Table 2.

From Table 2, it will be appreciated that the incorporation in the amounts indicated for the compositions according to the invention of a polycarbonate resin in a composition of methyl methacrylate resin and styrene-methyl methacrylate copolymer resin results in a remarkable improvement in the impact strength without loss of pearlescent luster.

Table 2

| No. | | Blend ratio (parts by weight) | | | | | Appearance (pearlescent luster) | Falling ball impact strength (cm) | Bending strength of weld line part (kg/cm$^2$) | Result |
| | | Methyl methacrylate resin | Styrene resin | Styrene-methyl methacrylate copolymer | | | | | | |
| | | | | Amount | Ratio of styrene/methyl methacrylate | Reduced viscosity (dl/g) | | | | |
| --- | --- | --- | --- | --- | --- | --- | --- | --- | --- | --- |
| 1 | Reference | 70 | 30 | | | | good | 12 | 200 | x |
| 2 | Example | 70 | — | 30 | 2.5 | — | " | 23 | 500 | o |
| 3 | " | 85 | — | 15 | 1.8 | 60 | " | 80 | 500 | o |
| 4 | " | 50 | — | 50 | 1.8 | 60 | " | 60 | 450 | o |
| 5 | " | 70 | — | 30 | 1.8 | 20 | " | 41 | 480 | o |
| 6 | " | 80 | — | 20 | 1.8 | 120 | " | 130 | 400 | o |
| 7 | Reference | 20 | — | 80 | 1.8 | 200 | not good | 75 | 310 | x |

What is claimed is:

1. A thermoplastic resin composition which consists essentially of from 30 to 80 parts by weight of a methyl methacrylate resin containing at least 80% by weight methyl methacrylate and from 70 to 20 parts by weight of a binary styrene-methyl methacrylate copolymer resin having a weight ratio of styrene/methyl methacrylate of from 80/20 to 30/70 and a reduced viscosity of from 0.5 to 3.5 dl/g in a 1% chloroform solution at 25°C.

2. A composition according to claim 1, wherein the methyl methacrylate resin is a homopolymer of methyl methacrylate or a copolymer of methyl methacrylate with a vinyl monomer.

3. A composition according to claim 1, wherein the methyl methacrylate resin is a copolymer of not less than 80% by weight of methyl methacrylate with acrylonitrile, N-allylmaleimide, methyl acrylate, ethyl acrylate, butyl acrylate, ethyl methacrylate or butyl methacrylate.

4. A composition according to claim 1, wherein the methyl methacrylate resin has a reduced viscosity of from 0.1 to 2.0 dl/g in a 1% chloroform solution at 25°C.

5. A composition according to claim 1, wherein the styrene-methyl methacrylate copolymer resin has a styrene/methyl methacrylate weight ratio of from 70/30 to 35/65, and a reduced viscosity of from 0.5 to 3.0 dl/g in a 1% chloroform solution at 25°C.

6. A molded product having a beautiful, pearlescent luster obtained from the thermoplastic resin composition as claimed in claim 1.

7. The composition according to claim 2, wherein said methyl methacrylate resin is a homopolymer.

8. The composition according to claim 2, wherein said methyl methacrylate resin contains about 97% methyl methacrylate.

9. The composition of claim 1, wherein the reduced viscosity of said methyl methacrylate resin is within 2 dl/g of the reduced viscosity of said binary styrene-methyl methacrylate copolymer resin.

10. A thermoplastic resin composition consisting essentially of 30 to 80 parts by weight of a methyl methacrylate resin consisting essentially of a methyl methacrylate homopolymer or a copolymer of methyl methacrylate with acrylonitrile, N-allylmaleimide, methyl acrylate, ethyl acrylate, butyl acrylate, ethyl methacrylate or butyl methacrylate, said methyl methacrylate resin containing at least 80% by weight methyl methacrylate, and 70 to 20 parts by weight of a binary styrene/methyl methacrylate copolymer resin having a weight ratio of styrene/methyl methacrylate of from 80/20 to 30/70 and a reduced viscosity of from 0.5 to 3.5 dl/g in a 1% chloroform solution at 25°C.

11. The compositon of claim 9, wherein said methyl methacrylate resin is a methyl methacrylate homopolymer.

* * * * *